(12) United States Patent
Gourlay (10) Patent No.: US 9,086,516 B2
(45) Date of Patent: Jul. 21, 2015

(54) LIGHT-GUIDE APPARATUS

(75) Inventor: James Gourlay, Lothian (GB)

(73) Assignee: DESIGN LED PRODUCTS LIMITED, Livingston (GB)

( * ) Notice: Subject to any disclaimer, the term of this patent is extended or adjusted under 35 U.S.C. 154(b) by 60 days.

(21) Appl. No.: 12/990,074

(22) PCT Filed: May 22, 2009

(86) PCT No.: PCT/GB2009/050559
§ 371 (c)(1),
(2), (4) Date: Oct. 28, 2010

(87) PCT Pub. No.: WO2009/141663
PCT Pub. Date: Nov. 26, 2009

(65) Prior Publication Data
US 2011/0044073 A1     Feb. 24, 2011

(30) Foreign Application Priority Data

May 23, 2008   (GB) .................................. 0809385.8

(51) Int. Cl.
*F21V 7/04* (2006.01)
*F21V 8/00* (2006.01)

(52) U.S. Cl.
CPC ............ *G02B 6/0043* (2013.01); *G02B 6/0061* (2013.01)

(58) Field of Classification Search
CPC .......................... G02B 6/0043; G02B 6/0061
USPC .................................................. 362/600–634
See application file for complete search history.

(56) References Cited

U.S. PATENT DOCUMENTS

| 5,178,447 | A | * | 1/1993 | Murase et al. ................ 362/621 |
| 5,386,347 | A | * | 1/1995 | Matsumoto ................... 362/623 |
| 5,584,556 | A | * | 12/1996 | Yokoyama et al. .......... 362/625 |
| 5,786,665 | A | | 7/1998 | Ohtsuki et al. |
| 6,755,547 | B2 | * | 6/2004 | Parker .......................... 362/618 |
| 2007/0002205 | A1 | | 1/2007 | Hasei |
| 2007/0279935 | A1 | | 12/2007 | Gardiner et al. |
| 2008/0232135 | A1 | | 9/2008 | Kinder et al. |

FOREIGN PATENT DOCUMENTS

| CN | 2364472 | 2/2000 |
| CN | 1892259 | 1/2007 |

\* cited by examiner

*Primary Examiner* — Anh Mai
*Assistant Examiner* — Jessica M Apenteng
(74) *Attorney, Agent, or Firm* — Nixon & Vanderhye P.C.

(57) ABSTRACT

A light-guide apparatus comprising a light-guide plate for guiding light rays and a plurality of light extraction features is described. The light extraction features comprise a transparent material applied to the light-guide plate so as to form an uneven surface. The transparent material may comprise a textured ink applied to the surface of the light-guide plate via a printing process. The incorporation of an uneven surface provides micro-lens like elements on the surface of the extraction feature which have a higher aspect ratio and so lend themselves to the refraction of the light out of the light-guide plate. In this way a device is produced wherein the size, height, location and surface profile of the extraction features can be carefully controlled. As a result the described light-guide apparatus provides for a highly efficient and relatively uniform light output.

29 Claims, 6 Drawing Sheets

LIGHT-GUIDE APPARATUS

This application is the U.S. national phase of International Application No. PCT/GB2009/050559 filed May 22, 2009 which designated the U.S. and claims priority to Great Britain Application No. 0809385.8 filed May 23, 2008, the entire contents of each of which are hereby incorporated by reference.

The present invention relates to a light-guide apparatus for illumination, lighting and display purposes and, particularly, to a light-guide apparatus having a transparent extraction feature.

A number of light-guide devices are known to those skilled in the art. These devices are employed for a range of functions including illumination, backlighting, signage and display purposes. It is known to incorporate surface features on a light-guide so as disturb the total internal reflection of the light guided within the light-guide. Disturbing the total internal reflection condition allows the light to exit the light-guide through a surface. Varying the physical characteristics of the surface features allows control of how much light exits the guide at a particular position.

There are two main physical principles employed to disturb the total internal reflection, namely reflection and refraction. Reflection involves the light interacting with a reflecting material on the surface of the light-guide which is absorbed and then re-emitted and so breaks down the effect of total internal reflection. A white material, for example, a white ink is commonly employed as a reflecting medium. The white ink emits the light in random directions (commonly called scattering) and most of this light is incident on an opposing surface at an angle lower than the critical angle for total the internal reflection condition to apply and so the light can exit the light-guide from this surface.

It is known to apply the white ink scattering features in the form of printed white dots. Printing methods provide a low unit cost and a low tooling cost with designs that can be rapidly and cost-effectively modified. However, using ink dots to reflect light from a light guide in this manner is an inefficient method for manipulating the light so that it exits the light-guide. Particles within the ink dots are poor reflectors of light and therefore a not insignificant proportion of the light is simply absorbed rather than being reflected. Employing white ink dots also limits the system-level recycling capabilities by the addition of brightness enhancement films.

A more optically efficient solution is to use refractive effects, where the shape of the exit surface is locally modified on small scale such that the effective angle of incidence of the guided light is changed below the critical angle and light can therefore exit in accordance with Snell's Law. Mechanical machining and laser machining of the light-guide surface have been deployed to achieve this effect, but in these systems the surface roughness of the resulting surface features can be very high.

Injection moulding, micro-moulding or micro-embossing of transparent hemispherical micro lens features onto the light-guide gives a much more efficient and controllable interference with the guided light, making the design of a uniform and efficient solution much easier. However, injection moulding or other hard tooled methods of producing refractive features on a light-guide device are known to be relatively expensive.

Additive processes, such as the printing of a transparent hemispherical lens features have been proposed (e.g. ink jet printing). However, known inks and printing techniques exhibit many limitations as to the size of feature, reproducibility and to the ability to achieve variation in the lens features required to achieve a high level of uniformity across a light-guide, both on large scales (i.e. size of lenses controls light extraction) and small scales (i.e. pitch between the lenses requires the employment of strong diffusers and thicker light-guides).

Typically, light-guide devices with reflecting or refracting features are constructed from an injection moulded or machined transparent plastic component, where a light source, such as a fluorescent lamp or a plurality of LEDs, is integrated by means of mechanical attachment at the edge of the transparent plastic component known as the light-guide plate. Examples of such devices are provided by the authors within PCT Publication No. 2005/101070.

The terms transparent and opaque refer to the optical properties of a component of the light-guide apparatus at the wavelengths of the light generated by the light source employed with the apparatus.

SUMMARY OF INVENTION

According to a first aspect of the present invention there is provided a light-guide apparatus comprising a light-guide plate for guiding light rays and a plurality of light extraction features, the light extraction features comprising a transparent material applied to the light-guide plate and having an uneven surface consisting of at least one randomly sized and shaped micro lens-like element wherein light rays incident upon the uneven surface are refracted out of the light guide apparatus.

Uneven in this context is taken to mean irregular; varying; or non uniform. The incorporation of an uneven surface provides preferential areas of the extraction feature which have a higher aspect ratio and so lend themselves to the refraction of the light out of the light-guide plate around the direction normal to the light-guide plate i.e. these features provide light at a preferential beam angle that is directed towards the observer. This result in an apparatus having an improved extraction efficiency when compared to an extraction feature having a relatively smooth hemispherical surface.

A micro lens-like element is a curved sector of the exit surface of the extraction feature whose size is a factor of two, or more, smaller than the size of extraction feature upon which it is located. As a result the micro lens-like element exhibits a higher aspect ratio than the light extraction features taken as a whole and so provide regions that lend themselves to the preferential refraction of light out of the light-guide plate around the direction normal to the light-guide plate.

Preferably, the plurality of light extraction features are discontinuous, that is, there is no transparent material present between adjacent extraction features.

Preferably the plurality of light extraction features are arranged in an array upon a surface of the light-guide plate.

Optionally the array comprises a regular array.

Preferably the volume of the light extraction features increase from one side of the array to the other. Optionally the volume increases by increases the size of the extraction feature. Alternatively, or in addition, the volume is increased by increasing the height of the light extraction features.

Preferably, the light extraction features comprise lines across the light-guide plate.

Alternatively, the light extraction features are dots.

Preferably, the transparent material is a printed transparent material applied to the light-guide plate by printing means.

Most preferably, the transparent material comprises a transparent textured ink.

Preferably, the printed transparent material has the same or similar refractive index to that of the light-guide plate.

Preferably, the light-guide plate comprises a transparent polymer sheet.

According to the second aspect of the invention there is provided a display comprising a light-guide apparatus according to the first aspect of the present invention.

Preferably, the display further comprises a reflecting means provided spaced apart from one side of the light-guide plate for reflecting light extracted towards the reflecting means towards the other side of the light-guide plate.

The reflecting means can be specular or non-specular.

Alternatively, or in addition, the display further comprises a diffusing means arranged on one side of the light-guide means in the direction that the display will be viewed from. Where the display comprises a diffusing means and a reflecting means, the reflecting means is arranged on the opposite side of the light-guide from the diffusing means.

According to a third aspect of the present invention there is provided a method of manufacturing a light-guide apparatus having one or more extraction features comprising the steps of:
  applying a transparent material onto a surface of light-guide so as to define the position of the one or more extraction features; and
  drying or curing the transparent material such that the light extraction features comprise at least one randomly sized and shaped micro lens-like element.

The incorporation of an uneven surface provides areas of the extraction feature which have a higher aspect ratio and so lend themselves to the refraction of the light out of the light-guide plate around the direction normal to the light-guide plate.

The micro lens-like element exhibits a higher aspect ratio than the light extraction features taken as a whole and so provide regions that lend themselves to the refraction of the light out of the light-guide plate.

Preferably, the plurality of light extraction features are applied discontinuously on to the light-guide plate, that is, there is no transparent material present between extraction features.

Preferably the plurality of light extraction features are applied to form an array upon a surface of the light-guide plate.

Optionally the array comprises a regular array.

Preferably the plurality of light extraction features are applied such that the volume of the light extraction features increase from one side of the array to the other. Optionally the volume increases by increases the size of the extraction feature. Alternatively, or in addition, the volume is increased by increasing the height of the light extraction features.

Preferably, the step of applying the plurality of light extraction features comprises printing of the transparent material. Most preferably the printing of the transparent material comprise a screen printing process.

Preferably, the transparent material is a textured transparent ink. Optionally the textured transparent ink comprises Autotype® Fototex or Norcote® 09-CL2.

According to a fourth aspect of the present invention there is provided a light-guide apparatus comprising a light-guide plate for guiding light rays and a plurality of light extraction features, wherein the light extraction features comprise a transparent material applied to the light-guide plate so as to form a contoured surface having at least one micro lens-like element.

Such an apparatus provides for the control of uniformity of the light extracted, but also, the high aspect ratio of the micro lens-like element, increases the number of extracted beams extracted around the direction normal to the light-guide plate. As a result light is extracted at a preferential beam angle directed towards the observer, which results in improved system efficiency.

BRIEF DESCRIPTION OF DRAWINGS

Aspects and advantages of the present invention will become apparent upon reading the following detailed description and upon reference to the following drawings in which.

In the description which follows, like parts are marked throughout the specification and drawings with the same reference numerals. The drawings are not necessarily to scale and the proportions of certain parts have been exaggerated to better illustrate details and features of embodiments of the invention.

DETAILED DESCRIPTION

Figure 1:
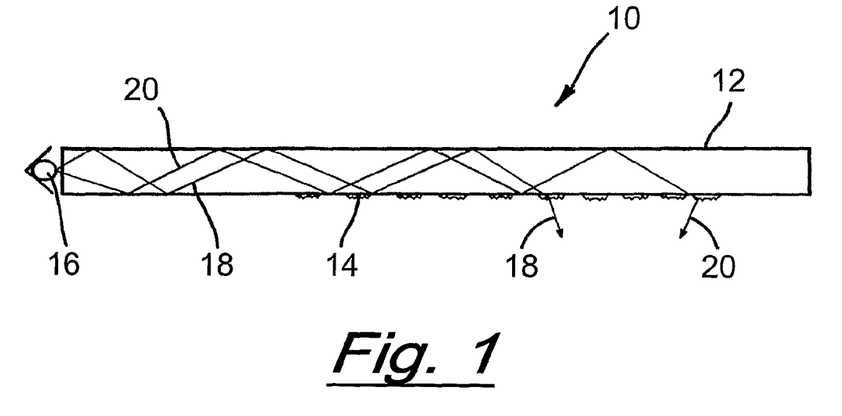
FIG. 1 shows a side elevation of a light-guide apparatus as described herein.

Referring to FIG. 1, a light-guide apparatus 10 is shown comprising a light-guide plate 12 and a plurality of light extraction features 14. To help describe the operation of the light-guide apparatus 10, a light source 16, such as an LED or Cold Cathode Fluorescent Lamp (CCFL), is shown coupling light into the light-guide plate 12 along with light rays 18 and 20.

The extraction features 14 comprise a transparent material applied to the outer surface of the light-guide plate 12 and are designed or applied such that they have an uneven or contoured surface, as opposed to the regular hemispherical shape as known to those skilled in the art. Preferably, the transparent material is printed onto the light-guide plate 12 and is a "textured" transparent ink such as Autotype® Fototex or Norcote® 09-CL2. These types of textured transparent inks, when cured using UV (ultra violet) light, form the uneven or contoured textured surface with a typical scale of height/dimension in range of 1 micron to 100 microns. The strength of light extraction from each printed dot can be modified by having a greater size or depth of texture to the ink —usually achieved by changing either the chemistry of the material or its curing process conditions. A greater texture or greater surface roughness, gives a higher level of light extraction from an extraction feature. A wide range of printing methods can be deployed to deliver the textured transparent ink onto the light-guide plate although the preferred method to be used is screen printing.

As can be seen from FIG. 1 the extraction features 14 are discontinuous, that is each extraction feature 14 is applied separately onto the light-guide plate 12. This has the advantage of providing a better efficiency of light transmission where there is no light extraction features, as the surfaces of the light-guide plate 12 have no additional coating or laminate.

As shown in FIG. 1, light rays 18 and 20 travel from the light source 16 along the light-guide plate 12 by means of total internal reflection. Total internal reflection occurs when a ray of light strikes a medium boundary at an angle larger than the "critical angle" with respect to the normal to the surface, where the refractive index is lower on the other side of the medium boundary. The critical angle is the angle of incidence above which the total internal reflection occurs.

The extraction features 14 have a refractive index similar, or the same as, that of the light-guide plate 12. Accordingly, light rays 18 and 20 pass into the extraction features 14 and thereafter strike an outer surface of the extraction features 14. As the outer surface of the extraction features 14 is uneven or contoured, the light rays 18 and 20, in this case, strike a portion of the uneven surface which is at an angle that does not provide total internal reflection and the light can therefore exit the apparatus 10 via the extraction features 14.

Figure 2:
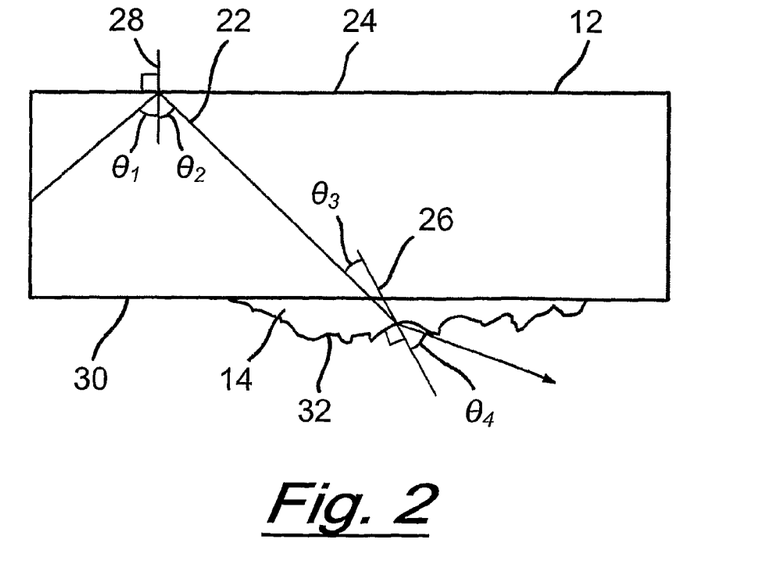
FIG. 2 shows a close up of the path of a light-ray exiting the light-guide of FIG. 1 due to being refracted by a extraction feature as described herein.

Referring to FIG. 2, a close up of an embodiment of the light-guide plate 12 and an extraction feature 14 is shown with a light ray 22. The light ray 22 reflects off surface 24 as the angle of incidence $\theta_1$ to the normal 28 is greater than the "critical angle" for the boundary between the light-guide plate 12 and, in this case, the surrounding air.

Snell's law states that the ratio of the sines of the angles of incidence and refraction is equivalent to the ratio of velocities in two media, or equivalent to the opposite ratio of the indices of refraction:

$$\frac{\sin\theta_1}{\sin\theta_2} = \frac{v_1}{v_2} = \frac{n_2}{n_1}$$

When light moves from a dense medium to a less dense medium, such as from water to air, Snell's law cannot be used to calculate the refracted angle when the resolved sine value is higher than 1. At this point, light is reflected in the incident medium, giving total internal reflection.

The light guide plate 12 is preferably a transparent polymer such as acrylic or polycarbonate, which has a refractive index of approximately 1.5. Air has a refractive index of approximately 1. Accordingly, as an example, consider a ray of light 22 that is incident to the surface 24 at an angle of 50° ($\theta_1$ equals 50°) from inside the light-guide plate 12, as shown in FIG. 2. When the corresponding angle $\theta_2$ is calculated using Snell's Law, then the resulting sine value will not invert, and thus the refracted angle cannot be calculated by Snell's law, due to the absence of a refracted outgoing ray:

$$\theta_2 = \sin^{-1}\left(\frac{n_1}{n_2}\sin\theta_1\right) = \sin^{-1}\left(\frac{1.5}{1}0.766\right) = \sin^{-1}1.149$$

In order to calculate the critical angle, let $\theta_2=90°$ and solve for $\theta_{crit}$:

$$\theta_{crit} = \sin^{-1}\left(\frac{n_2}{n_1}\right) = \sin^{-1}0.666 = 41.81°$$

When $\theta_1>\theta_{crit}$, no refracted ray appears, and the incident ray undergoes total internal reflection from the interface medium.

Accordingly, as the extraction feature 14 has the same or similar refractive index as the light-guide plate 12, the light ray 22 passes through the boundary 30 between the light guide plate 12 and the extraction feature 14 with little or no deviation. The light ray 22 then meets the boundary 32 between the extraction feature 14 and air. In this example, the angle of incidence to the normal $\theta_3$ is around 20°, which would give a corresponding refraction to the normal 26 of around 31° for the angle $\theta_4$ using the equations established above.

Figure 3:
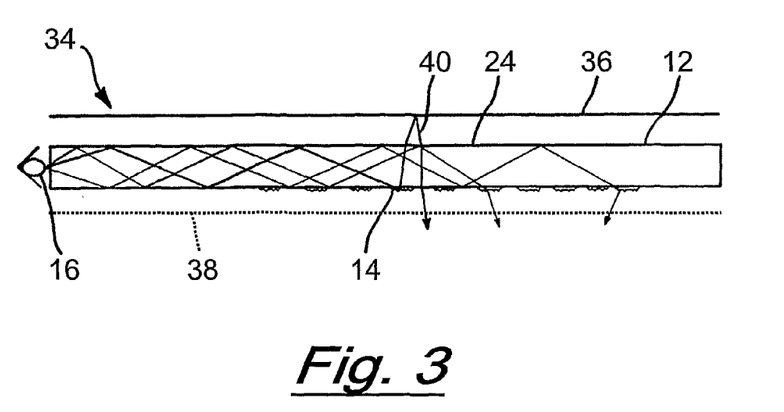
FIG. 3 shows a display incorporating the light-guide apparatus of FIG. 1.

Referring now to FIG. 3, a display 34 is presented that incorporates a light-guide apparatus 10, as previously described is shown, along with a light source 16, a reflecting means 36 and a diffusing means 38.

The pattern of the surface extraction features 14 can be optimised to make the level of light escaping across the light-guide plate 12 uniform, as described in further detail below. Typically, an array of extraction features 14 printed, with small sized extraction features 14 near the light source edge and larger sized extraction features 14 at a distance from the edge is one way of giving a uniform light extraction.

The display's 34 performance can be enhanced by the addition of the reflecting means 36 on the side of the light-guide plate 12 opposite to which the extraction features 14 are deployed. As is shown, a light ray 40 may be reflected out of the light-guide plate 12 by an extraction feature 14 and then reflected at an angle by the reflecting means 36 back through the light-guide plate 12. The reflecting means 36 can be specular or non-specular, and could be, for example a 3M ECR.

In addition, a diffusing means 38 may optionally be located on the same side of the light-guide plate 12 upon which the extraction features 14 are deployed so as to make the observed light distribution more homogeneous and so assist in concealing the pattern of the extraction features 14. A suitable diffusing means 38 could be, for example a Shinwha SD743.

Figure 4:
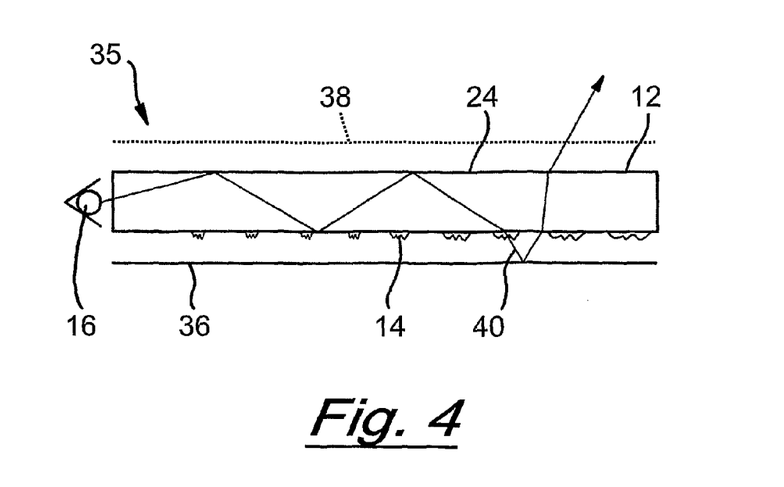
FIG. 4 shows an alternative display incorporating the light-guide apparatus of FIG. 1.

FIG. 4 presents an alternative embodiment of the display 35. The display 35 again incorporates a light-guide apparatus 10, as previously described is shown, along with a light source 16, a reflecting means 36 and a diffusing means 38. In the presently described embodiment the reflecting means 36 is located on the side of the light-guide plate 12 upon which the extraction features 14 are deployed. If employed, the diffusing means 38 is located on the opposite side of the light-guide plate 12 upon which the extraction features 14 are deployed so as to make the observed light distribution more homogeneous and so assist in concealing the pattern of the extraction features 14.

Having the diffusing means 38 is on the opposite side of the light-guide plate 12 from the extraction features 14, means that the light ray path from exit of the extraction features 14 to the diffusing means 38 is longer, which provides for better diffusion of the light. That is, the pattern of the extraction features 14 is not so easily seen and a more even distribution of light results.

The use of transparent extraction features 14 provides displays which may optionally incorporate system-level recycling capabilities e.g. by the addition of a brightness enhancement films on the surface 24 of the light guide plate 12 or on the diffuser 38. The inclusion of such features acts to further increase the observed illumination from the display.

Figure 5A:
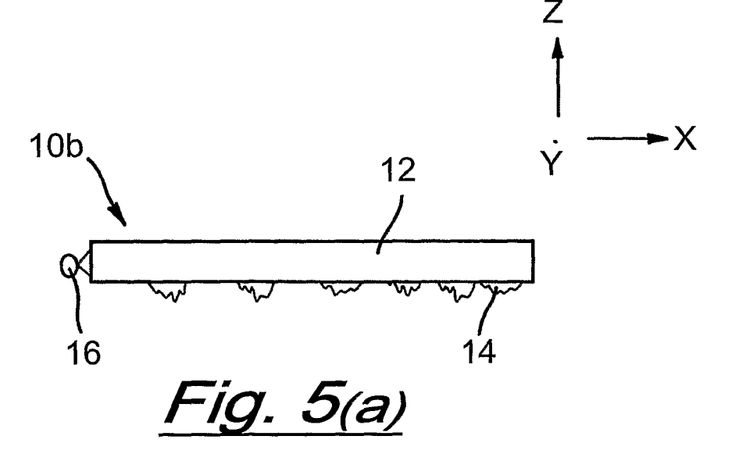
FIG. 5 shows side elevations of three alternative light-guide apparatus.
Figure 5B:
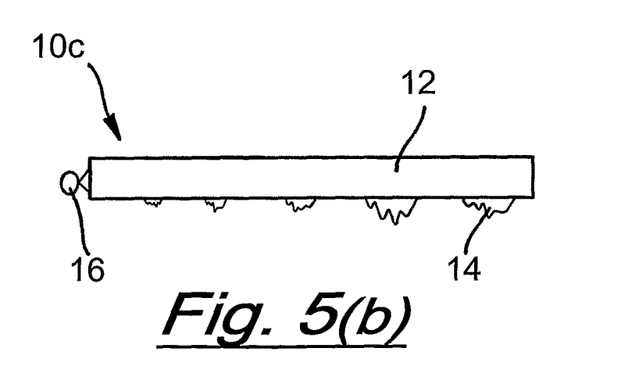
Figure 5C:
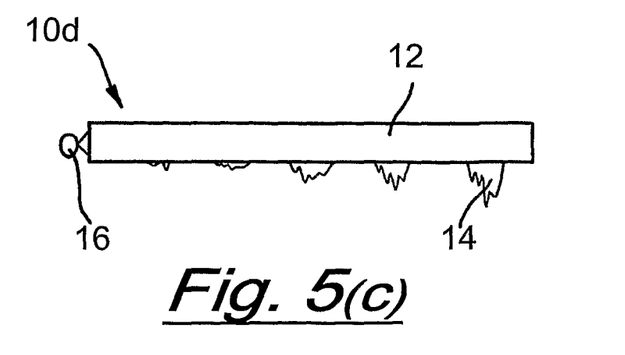
Figure 6:
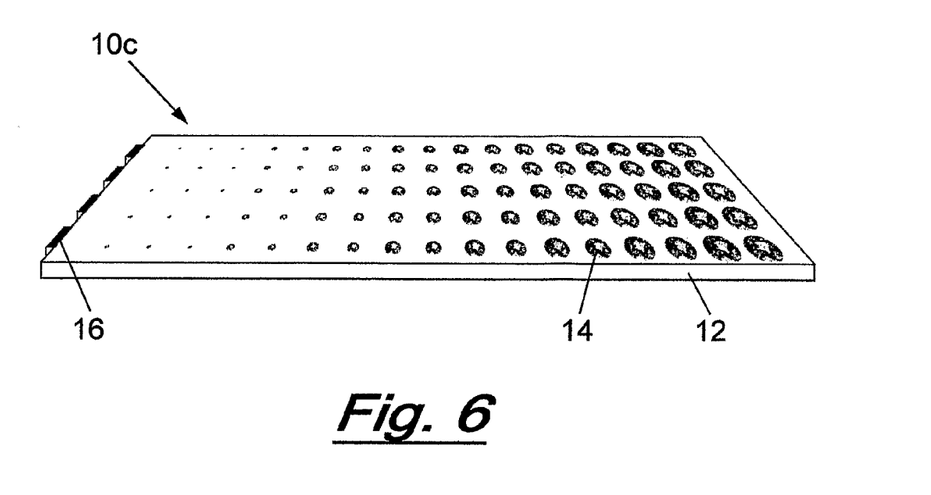
FIG. 6 shows a perspective view of the light-guide apparatus of FIG. 4(b)

As discussed above, the pattern of the extraction features 14 may be of the form of an array of different sized features 14, examples of which are provided within FIG. 5 and FIG. 6. In particular FIG. 5 provides three side elevations of a light-guide apparatus 10b, 10c and 10d wherein the surface upon which the extraction feature 14 are deployed is located in the x-y plane that is perpendicular to the plane of the page while the x-z plane is coplanar with the plane of the page.

In the following description the height of an extraction feature 14 refers to its dimension along the z-axis while its size refers to the area covered by the extraction feature 14 within the x-y plane. The term pitch relates to the separation of the extraction features 14 along the direction of the x-axis while the width of a feature relates to its dimension along the x-axis. Finally the aspect ratio of a feature relates to the ratio between the height and the width of a feature 14.

A number of factors are found to influence the amount of light extracted out of the light-guide plate 12 by the extraction features 14. These factors include the size and height of the extraction features 14, generally the larger the size or height the more light is found to be extracted. Varying the pitch between the extraction features 14 can also be used to control the light extraction i.e. as there is less light in the light-guide as we move away from the light source then the pitch of the extraction features 14 is required to be reduced so as to maintain a uniform light output.

In accordance with these definitions FIG. 5(a) presents a light guide apparatus 10b wherein the extraction features 14 have the same size and height but the pitch between them is reduced as we move away from the light source 16. FIG. 5(b) presents a light guide apparatus 10c wherein the extraction features 14 have the same height and pitch but have an increasing size as we move away from the light source 16. Finally, FIG. 5(c) presents a light guide apparatus 10d wherein the extraction features 14 have the same pitch and the same size. However in this embodiment the height of the extraction features 14 increases as we move away from the light source 16. All three of these described embodiments allow for the controlled extraction of the light and hence can provide a uniform illumination across the exit surface 30 of the light guide apparatus 10.

The preferred embodiment is that presented in FIG. 5(b), a schematic perspective view of which is provided in FIG. 6, where the extraction features 14 have the same height and pitch but which have an increasing size as we move away from the light source 16. In the embodiment presented in FIG. 6, four side coupled light sources 16 are incorporated with the light-guide plate 12. These light sources 16 may generate light of the same colour, or different colours, depending on the desired output from the apparatus 10c.

Figure 7:
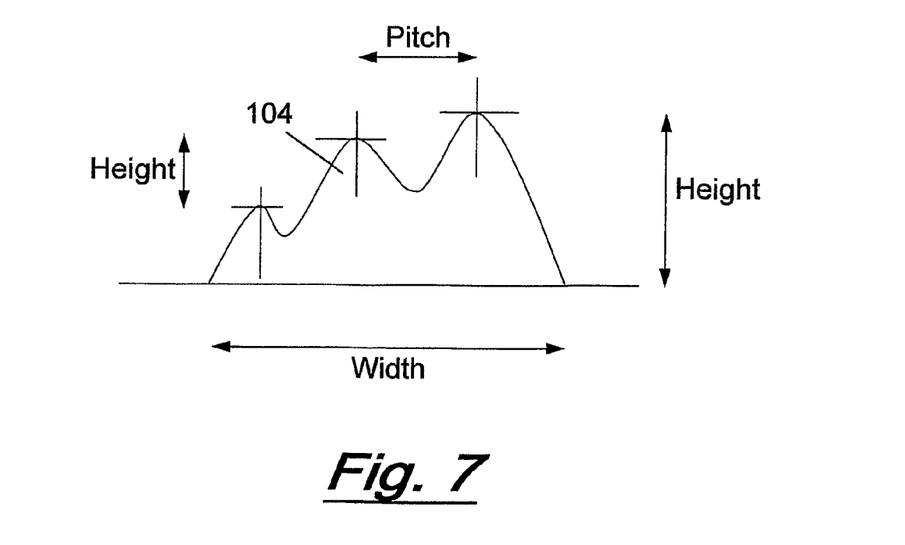
FIG. 7 shows a side view of a surface topography of a typical extraction feature of the light-guide apparatus of FIG. 4(b)

FIG. 7 shows a side view of a surface topography of a typical extraction feature 14 of the light-guide apparatus of FIG. 5(b). These figure allow the further detail of the extraction feature 14 produced by the method described below to be observed.

Unlike the substantially hemispherical extraction features known in the art, the extraction features 14 of the present invention can be seen to comprise significant surface texture. In particular FIG. 7 shows the extraction features 14 comprising three distinct micro lens-like elements 104 located upon a common surface 32 across the width of the extraction feature 14. Typically the extraction features 14 have a width of the order of 100 microns and a height of the order of 10 microns. The micro lens-like elements 104 have a width of the order of 10 to 40 microns and a height of the order of 10 microns.

Significantly this provides the extraction feature 14, as a whole (i.e. the substantially hemispherical extraction features known in the art) with an aspect ratio that is significantly lower than that of the individual micro lens-like elements 104. A low aspect ratio effectively corresponds to a weak lens, and so exhibits a low impact on the critical angle and thus low extraction of light. A high aspect ratio corresponds to a strong lens and so a high impact on the critical angle and thus a larger extraction of light. Thus the incorporation of the sub features within the extraction feature 14 acts to significantly increase the light extracted out of the light-guide plate 12 when compared with a substantially hemispherical extraction features having the same overall size and height.

Although FIG. 7 presents an extraction feature 14 comprising three micro lens-like elements 104 it will be appreciated that the invention is not so limited. It is found that the incorporation of even a single micro lens-like element 104 provides an extraction feature 14 with a contoured exit surface 32 that increase the extraction properties of the feature when compared to substantially hemispherical extraction features having the same overall size and height. In practice the size of the extraction feature can be large (several hundred microns) while the textured micro lens-like elements 104 are of the order of 5-50 microns an so provide optical lensing effects that have aspect ratios significantly higher than a normal lens of the size and height of the whole extraction feature.

Method of Production

There now follows a description of a method of production of the light guide apparatus. The preferred embodiment is to employ a screen printing process to apply a textured ink onto the surface of the light guide which is thereafter cured using UV (ultra violet) light. It will however be appreciated that other known printing methods may alternatively be employed.

In the first instance a screen is made of a piece of porous, finely woven fabric called mesh is stretched over a rigid frame. The mesh may be made of materials such as steel, nylon, or polyester. Areas of the screen are then blocked off with a non-permeable material using photo-masking processes so as to form a stencil, which is a negative of the image to be printed i.e. the open spaces are where the textured ink will appear on the light-guide plate 12.

The next step involves placing the screen on top the light-guide plate 12. The transparent textured ink is then placed on top of the screen, and a fill bar (also known as a flood bar) is employed to fill the mesh openings with the textured ink. An operator or machine is employed to lift the screen to prevent contact with the light-guide plate 12 and to locate the fill bar behind a reservoir of textured ink at one side of the screen. A small downward force is then applied to the fill bar as it is pulled across the surface of the screen. This effectively fills the mesh openings with the textured ink while moving the textured ink reservoir from one side of the screen to the other.

A rubber blade is then moved across the surface of the screen with a downward force being applied so as to move the mesh down onto the light-guide plate 12. The ink that is in the mesh opening is therefore pumped or squeezed by capillary action onto the light-guide plate 12 in a controlled and prescribed amount, i.e. the wet textured ink deposit is equal to the thickness of the mesh and or the stencil. As the rubber blade moves across the screen the tension of the mesh pulls it up and away from the light-guide plate 12 (called snap-off) leaving the transparent textured ink upon the light-guide surface 30 in a defined volume and in locations prescribed by the pattern in the screen.

Finally the wet textured ink is cured using UV (ultra violet) light so as fix the extraction features 14 upon the surface of the light-guide plate 12.

It is during this curing process that the fine structure of the micro lenses 104 is developed across the surface 32 of the extraction feature 14. In practice the precise form of the surface 32 of the extraction feature 14 is found to be dependent upon chemistry of the textured ink and on the curing process conditions. Therefore, as well as the feature size and pitch the height the textured exit surface 32 can be controlled by selecting an appropriate transparent ink (e.g. by varying particle additives, viscosity or surface tensions) or by varying an appropriate parameter of the printing process e.g. screen type, print speed or curing time.

It is however noted that deploying a known composition and volume of textured ink having a controlled size and height may produce a slightly different microscopic surface 32 profile e.g. one, two or four micro lenses 104 instead of the previously described three micro lens 104 surface. However, the macroscopic light extraction levels for extraction features 14 made from the same ink and having a similar size and height are similar and thus the described methods provide highly controlled and reproducible results.

As previously described, the correct design of the surface feature variation allows a uniform extraction of light across the light-guide apparatus 10 to make a useful and uniform backlight. This is achieved by the employment of prefabricated stencils within the printing process. For example, the light guide apparatus 10*b* presented in FIG. 5(*a*) is achieved by employing a stencil/mesh pattern that will provide extraction features 14 of equal size but having a decreasing pitch while the light guide apparatus 10*c* presented in FIG. 5(*b*) is achieved by employing a stencil/mesh pattern that will provide extraction features 14 of increasing size but having a constant pitch.

To produce the light guide apparatus 10*c* presented in FIG. 5(*c*) it is necessary to employ multiple screen printing steps, effectively one print run is employed to lay down all the extraction features 14 having a common height. In the presently described embodiment this would require a separate mesh/stencil to be employed for each row of extraction features 14.

The light extraction feature 14 can therefore be considered to be a transparent feature with an uneven surface consisting of a number of randomly sized and shaped micro lens-like elements 104. The advantage of such an apparatus is the increased control of uniformity of the extracted light. In addition the high aspect ratio of the micro lens-like elements 104, increases the number of extracted beams extracted around the direction normal to the light-guide plate 12 i.e. gives a preferential extracted light at a beam angle directed towards the observer. This results in an apparatus of improved efficiency.

Specific Example

Figure 8:
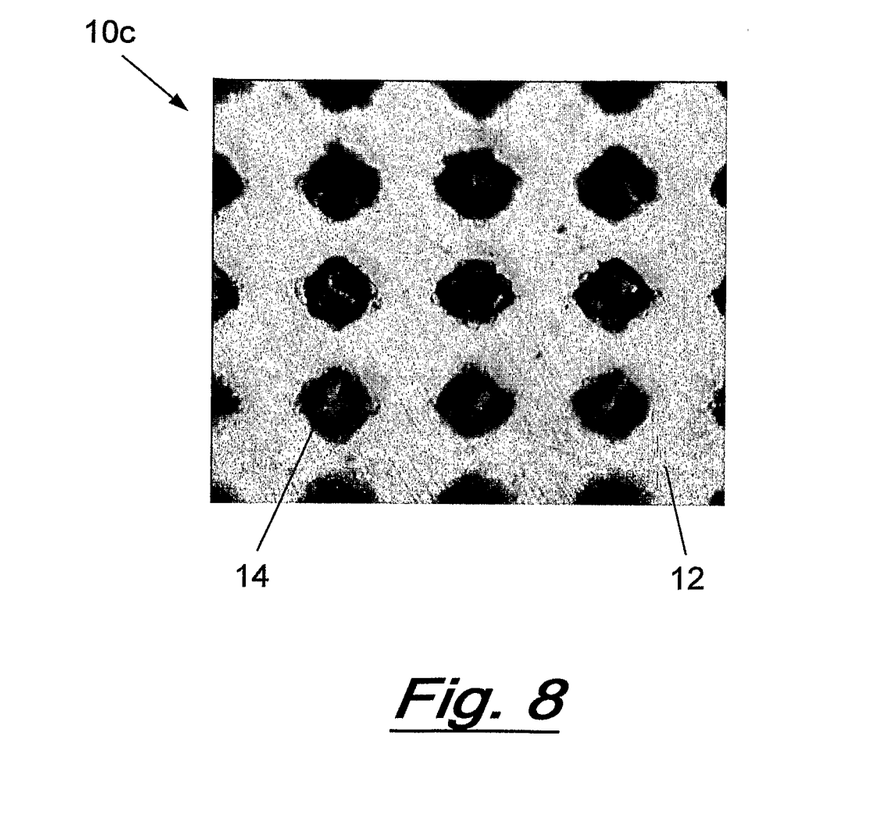
FIG. 8 shows a top view image of an actual light-guide apparatus based on the design of FIG. 4(b) and FIG. 5.
Figure 9:
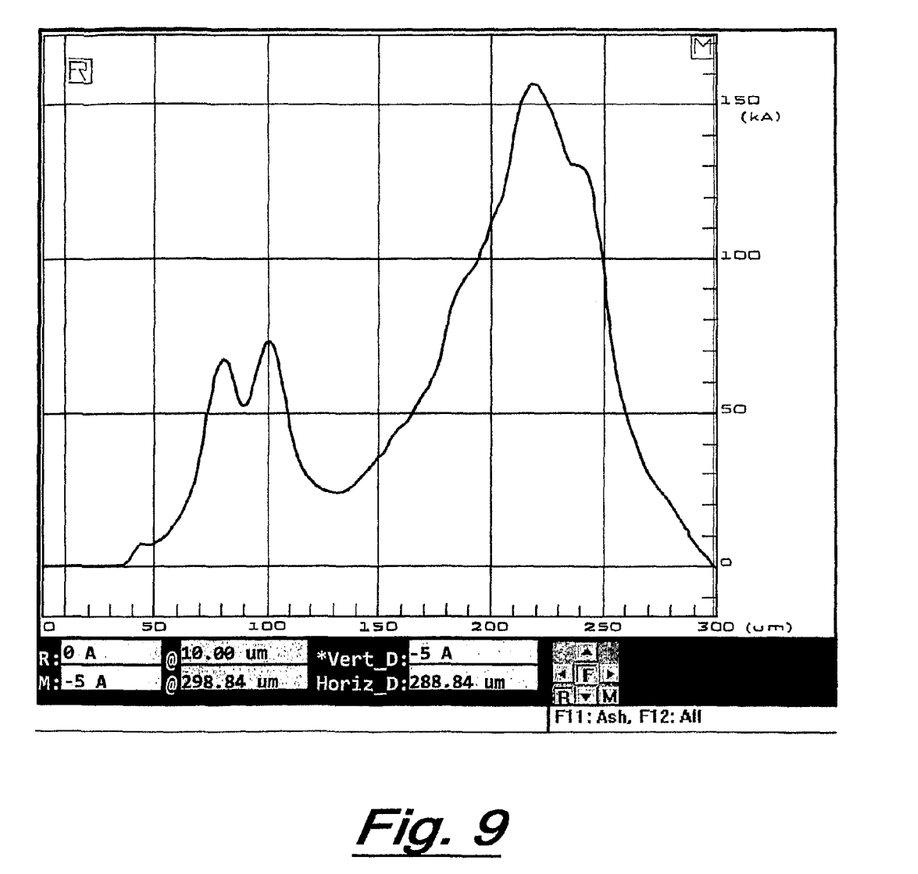
FIG. 9 shows an experimental trace of a cross section taken through an extraction feature of the light-guide apparatus of FIG. 8.

FIG. 8 presents a top view image of an actual light-guide apparatus 10*c* based on the design of FIG. 5(*b*) and FIG. 6 while FIG. 9 shows an experimental trace of a cross section taken through an extraction feature 14 of the light-guide apparatus of FIG. 8.

The light guide apparatus 10*c* of FIG. 8 comprises a 50 mm×50 mm square acrylic sheet (in particular a Clarex® Precision Optical sheet) of 0.75 mm thickness that incorporates 0.6 mm height white side emitting LEDs (Nichia NSSW 006T) on one side of the light-guide plate 12. The extraction features 14 comprise Norcote® 09-CL2, a material that has silica spheres inside the polymer to as to further enhance the texture, and are arranged to have a pitch of 500 micron. The extraction features 14 sizes increase from 100 micron to 400 microns as we move away from the LED positions. With this arrangement it was found that the number of micro lenses 104 located within the extraction features 14 varied in number from 4-9, with aspect ratios ranging from 2:1 to 10:1.

A Minolta® Chroma Meter CS-100A and lens system was then employed to measure the uniformity of illumination across a 1.5 mm spot size of the actual light-guide apparatus 10*c* where:

Uniformity=(Max Reading−Min Reading)/Max Reading

The measured uniformity for the light-guide apparatus 10*c* was of the order of 90%.

The light guide apparatus 10 described herein provides a device within which the size, height, location and surface profile of the extraction features 14 can be carefully controlled. By creating extraction features 14 having micro lenses 104 with high aspect ratios provides an extraction feature 14 with good optical properties and increased extraction capabilities when compared to an extraction feature comprising a substantially hemispherical profile. Furthermore, by employing a textured ink that is deployed on a light-guide plate 12 before being cured allows conventional printing methods, and in particular screen printing methods, to be employed within the production process.

Greater control of the extraction of light is achieved by employing the described light guide apparatus 10 and so results in a more uniform light output being achieved. As a result of the increased extraction of the light achieved by the extraction features 14 the need to employ a diffusing means 38 to diffuse the output light and mask the extraction features is removed so decreasing the production costs of the devices.

The foregoing description of the invention has been presented for purposes of illustration and description and is not intended to be exhaustive or to limit the invention to the precise form disclosed. The described embodiments were chosen and described in order to best explain the principles of the invention and its practical application to thereby enable others skilled in the art to best utilise the invention in various embodiments and with various modifications as are suited to the particular use contemplated. Therefore, further modifications or improvements may be incorporated without departing from the scope of the invention as defined by the appended claims.

The invention claimed is:

1. A light-guide apparatus comprising a light-guide plate for guiding light rays and a plurality of light extraction features, each light extraction feature comprising a transparent, textured ink that has been applied to the light-guide plate and that has an uneven, irregular exterior surface comprising at least one randomly sized and shaped micro lens-like element, wherein light rays incident upon the uneven exterior surface of the light extraction feature are refracted out of the uneven exterior surface of the transparent textured ink.

2. A light-guide apparatus as claimed in claim 1 wherein the uneven, irregular exterior surface provides the light guide plate with preferential areas that exhibit a higher aspect ratio than the light extraction feature taken as a whole.

3. A light-guide apparatus as claimed in claim 1 wherein the plurality of light extraction features are discontinuous upon the light-guide plate.

4. A light-guide apparatus as claimed in claim 1 wherein the plurality of light extraction features are arranged in an array upon the surface of the light-guide plate.

5. A light-guide apparatus as claimed in claim 4 wherein the array comprises a regular array.

6. A light-guide apparatus as claimed in claim 4 wherein the volume of the light extraction features increase from one side of the array to the other.

7. A light-guide apparatus as claimed in claim 6 wherein the volume increases by incorporating light extraction features of increasing size.

8. A light-guide apparatus as claimed in claim 6 wherein the volume is increased by incorporating light extraction features of increasing height.

9. A light-guide apparatus as claimed in claim 1 wherein the light extraction features comprise lines across the light-guide plate.

10. A light-guide apparatus as claimed in claim 1 wherein the light extraction features are dots.

11. A light-guide apparatus as claimed in claim 1 wherein the transparent textured ink is applied to the light-guide plate by a printing process.

12. A light-guide apparatus as claimed in claim 1 wherein the transparent textured ink has the same or similar refractive index to that of the light-guide plate.

13. A light-guide apparatus as claimed in claim 1 wherein the light-guide plate comprises a transparent polymer sheet.

14. A display comprising a light-guide apparatus as claimed in claim 1.

15. A display as claimed in claim 14 wherein the display further comprises a reflecting means provided spaced apart from one side of the light-guide plate for reflecting light extracted towards the reflecting means towards the other side of the light-guide plate.

16. A display as claimed in claim 15 wherein the reflecting means comprises a specular or non-specular reflector.

17. A display as claimed in claim 14 wherein the display further comprises a diffusing means arranged on one side of the light-guide means in the direction that the display will be viewed from.

18. A display as claimed in claim 17 wherein a reflecting means is arranged on the opposite side of the light-guide from the diffusing means.

19. A light-guide apparatus as claimed in claim 1 wherein the at least one micro lens-like element has a height in the range of 1 micron to 100 microns.

20. A light-guide apparatus as claimed in claim 1 wherein the light extraction features comprise micro lens-like elements having different heights.

21. A method of manufacturing a light-guide apparatus having one or more light extraction features comprising the steps of:
printing a transparent ink onto a surface of a light-guide so as to define the position of the one or more light extraction features; and
drying or curing the transparent ink to form light extraction features, wherein the drying or curing of the transparent ink causes an exterior surface of each light extraction feature to become uneven and irregular and to include at least one randomly sized and shaped micro lens-like element, wherein light rays passing through the light extraction features that are incident upon the uneven, irregular exterior surface are refracted out of the light extraction feature.

22. A method of manufacturing a light-guide apparatus as claimed in claim 21 wherein the plurality of light extraction features are applied discontinuously on to the light-guide plate.

23. A method of manufacturing a light-guide apparatus as claimed in claim 21 wherein the plurality of light extraction features are applied to form an array upon a surface of the light-guide plate.

24. A method of manufacturing a light-guide apparatus as claimed in claim 23 wherein the array comprises a regular array.

25. A method of manufacturing a light-guide apparatus as claimed in claim 23 wherein the plurality of light extraction features are applied such that the volume of the light extraction features increase from one side of the array to the other.

26. A method of manufacturing a light-guide apparatus as claimed in claim 25 wherein the volume is increased by incorporating light extraction features of increasing size.

27. A method of manufacturing a light-guide apparatus as claimed in claim 25 wherein the volume is increased by incorporating light extraction features of increasing height.

28. A method of manufacturing a light-guide apparatus as claimed in claim 21 wherein the printing of the transparent ink comprise a screen printing process.

29. A method of manufacturing a light-guide apparatus as claimed in claim 21 wherein the transparent material is a textured transparent ink.

* * * * *